(12) United States Patent
Moran et al.

(10) Patent No.: US 7,489,773 B1
(45) Date of Patent: Feb. 10, 2009

(54) STEREO CONFERENCING

(75) Inventors: Thomas Moran, Galway (IE); Francois Audet, Santa Clara, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 952 days.

(21) Appl. No.: 11/023,321

(22) Filed: Dec. 27, 2004

(51) Int. Cl.
*H04M 3/42* (2006.01)
(52) U.S. Cl. .................... 379/203.01; 370/252
(58) Field of Classification Search ............ 379/202.01, 379/203.01; 370/252
See application file for complete search history.

(56) References Cited

U.S. PATENT DOCUMENTS 6,408,327 B1 * 6/2002 McClennon et al. ........ 709/204

* cited by examiner

*Primary Examiner*—Creighton H Smith
(74) *Attorney, Agent, or Firm*—Barnes & Thornburg LLP

(57) ABSTRACT

Audio conferencing is carried out in stereo by centrally assigning a position in the stereo spectrum (either bipolar stereo or surround sound) and instructing each conference endpoint to transmit at the stereo position assigned to it. In this way signals from a number of endpoints can be simply added to one another in order to provide a composite broadcast signal. This method also facilitates multiple server conferences in which endpoints attached to additional conference servers can be instructed to change their virtual stereo position in the case of a conflict with the stereo position of an existing conferee.

24 Claims, 9 Drawing Sheets

| Position | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| % Left Channel | 100 | 95 | 90 | 85 | 80 | 75 | 70 | 65 | 60 | 55 | 50 | 45 | 40 | 35 | 30 | 25 | 20 | 15 | 10 | 5 | 0 |
| % Right Channel | 0 | 5 | 10 | 15 | 20 | 25 | 30 | 35 | 40 | 45 | 50 | 55 | 60 | 65 | 70 | 75 | 80 | 85 | 90 | 95 | 100 |
| Assigned to Conferee | | | C | | | A | | | F | | | | B | | | E | | | D | | |

Fig. 3

| Position | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| % Left Channel | 100 | 95 | 90 | 85 | 80 | 75 | 70 | 65 | 60 | 55 | 50 | 45 | 40 | 35 | 30 | 25 | 20 | 15 | 10 | 5 | 0 |
| % Right Channel | 0 | 5 | 10 | 15 | 20 | 25 | 30 | 35 | 40 | 45 | 50 | 55 | 60 | 65 | 70 | 75 | 80 | 85 | 90 | 95 | 100 |
| Assigned to Conferee | | | I | | | G | | | L | | | | H | | | K | | | J | | |

Fig. 9

| Position | 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|
| % Left Channel | 100 | 95 | 90 | 85 | 80 | 75 | 70 | 65 | 60 | 55 | 50 | 45 | 40 | 35 | 30 | 25 | 20 | 15 | 10 | 5 | 0 |
| % Right Channel | 0 | 5 | 10 | 15 | 20 | 25 | 30 | 35 | 40 | 45 | 50 | 55 | 60 | 65 | 70 | 75 | 80 | 85 | 90 | 95 | 100 |
| Assigned to Conferee | I* | | C | | A* | G | | L* | | F* | | B* | | H* | | K | B* | | J | | D* |

Fig. 10

STEREO CONFERENCING

FIELD OF THE INVENTION

This invention relates to telephony and multimedia conferencing, which includes audio signalling.

The term "conferencing" as used herein encompasses audio teleconferencing, video conferencing with an audio component, and other multi-media conferences incorporating an audio component.

BACKGROUND ART

The invention has particular application in the field of stereo conferencing. Stereo conferencing provides a spatially distinct virtual "placement" of the parties involved in a conference call. This assists users in differentiating between the various parties and in discerning which of the parties is talking at any particular time. While such systems are not widespread at present, it is expected that increased processing power and network bandwidth will lead to a more widespread use of stereo conferencing.

U.S. Pat. No. 6,408,327 to McClennon et al discloses a method for facilitating stereo conferencing of a plurality of uses over a network.

In the system of U.S. Pat. No. 6,408,327, a server receives transmitted signals from each endpoint in the conference. The server synthesises a stereo version of each signal, placing various signals at different stereo positions, and mixes the synthesised stereo signals to create a composite signal for transmission to the endpoints. This composite signal can be individualised for each endpoint, i.e. by removing the signal received from the endpoint to which it is to be transmitted, resulting in an echo-free signal being received at each endpoint. Alternatively, a single multicast signal can be transmitted to all of the endpoints and local echo correction can be carried out at each endpoint.

In another embodiment of U.S. Pat. No. 6,408,327, the server is dispensed with. Each client transmits its monaural (mono) signal to every other client involved in the conference call and an algorithm in the receiving client equipment synthesises a stereo signal from each received signal and mixes the synthesised stereo signals so that the other endpoints are virtually positioned in a stereo environment about the user at the receiving client.

While the system of U.S. Pat. No. 6,408,327 enables a user to differentiate between various parties due to their stereo position, the signal processing to synthesise stereo signals and create a stereo mix (either at the server or at each receiving endpoint) is quite intensive.

DISCLOSURE OF THE INVENTION

The invention provides a method of conferencing multiple communications endpoints which includes the steps of:
  a) assigning to a first endpoint a first position in a stereo spectrum;
  b) communicating the assigned first stereo position to that endpoint;
  c) receiving from that endpoint a first stereo signal encoded at the assigned first stereo position; and
  d) transmitting said received first stereo signal to a plurality of the other said endpoints.

As used in relation to the present invention, the term "stereo" is intended to encompass both bipolar (left/right) signals and multi-channel (surround-sound) signals.

By communicating a virtual stereo position to an endpoint, the stereo synthesis is delegated to the transmitting endpoint such that the endpoint is transmitting at a particular virtual position. This relieves the server (or other endpoints) from having to synthesise stereo mixes from each endpoint and having to rebalance each stereo signal to a different virtual position before mixing.

Preferably, the method further comprises the steps of
  a) assigning to a second of said endpoints a second position in said stereo spectrum;
  b) communicating to said second endpoint the assigned second stereo position;
  c) receiving from said second endpoint a second stereo signal encoded at said assigned second stereo position; and
  d) transmitting said received second stereo signal to a plurality of other endpoints.

Thus, it can be seen that the first and second endpoints are each instructed to transmit at a different stereo position. No further signal processing is required on either of these stereo signals and they can simply be transmitted onto each other endpoint.

Preferably, the first and second signals are added to one another before being transmitted to the plurality of other endpoints.

This is one of the primary advantages of the invention over the prior art—the signals when received from each active endpoint can be simply added to one another and retransmitted. No further processing of the stereo position is required because each signal has been generated at the stereo position at which it is required.

Alternatively, one of the first and second signals may be selected for transmission and transmitted to the plurality of other endpoints without adding the signal which is not selected.

In this scenario, certain signals can be designated as active (for transmission to other endpoints) and certain signals designated as passive (not for transmission). This designation is done on the basis of known algorithms, such as the loudest signal or the most recent speaker being the active signal. More than one signal can be active. Those signals which are passive are either discarded at the mixing stage or are not generated in the first place due to the conference controller instructing the passive endpoints to cease transmission for the time being.

Thus far, the discussion has been primarily limited to the invention as it operates for first and second endpoints in a conference. Of course, there will usually be at least three, and often many more, endpoints in a conference.

Preferably, therefore, a stereo position is assigned to each of the plurality of endpoints which is active in a conference and the assigned stereo position for each endpoint is transmitted to that endpoint.

In a particularly preferred embodiment, each endpoint is assigned a unique stereo position.

Alternatively, however, one or more of the endpoints is assigned a common stereo position.

Common stereo positioning can have major benefits. In a large conference, for example, it may be less important to know the identity of individuals than to know the organisation or team to which they belong, or their level of authority.

For example, in an arbitration between two parties, one might position each member of the arbitration team at a central point in the stereo spectrum, and position each member of the two organisations in dispute at either a left position or a right position so that each voice can be readily assigned to an organisation.

Suitably, stereo signals can be received from each of said endpoints and the received stereo signal from a single endpoint can then be selected for transmission to all other endpoints.

A subset of the received stereo signals from a subset of the endpoints can alternatively be added together to provide a composite stereo signal for transmission to all other endpoints.

Preferably, each endpoint in the subset of endpoints receives the composite signal minus the contribution made to the composite signal by its own stereo signal.

The amplitudes of the signals may be adjusted before being added to provide the composite signal.

All of the received signals from all of the active endpoints can be added together to provide a composite signal. In such cases echo correction can be delegated to the receiving endpoints if necessary.

When the method is conducted by a first conference server which controls a set of multiple communications endpoints, it can also include the further steps of:

a) receiving from a second conference server an identification of the stereo position assigned to at least one further endpoint under the control of the second conference server;

b) comparing the stereo position of the at least one further endpoint with the stereo positions of the endpoints under the control of the first conference server; and c) transmitting instructions to at least one endpoint which instructions are effective to cause the endpoint to vary its stereo position or transmitting instructions to the further conference server to cause the at least one further endpoint under the control of the second conference server to vary its stereo position.

This important additional feature of the invention allows the stereo positioning to be adaptable in circumstances where additional endpoints under the control of another conference server join a conference. Arising from the fact that each endpoint is broadcasting according to an assigned stereo position, the conference server can adjust the stereo position of any or all of the endpoints, or instruct a communicating conference server to issue such instructions, and thus the stereo distribution of endpoints can be optimised.

In a preferred embodiment, the method further includes comparing the characteristics of the audio signal from the first endpoint with the characteristics of the audio signal from one or more of the other endpoints, and making a determination of the assignment of stereo position based on the comparison, whereby similar sounding signals are spatially separated in the stereo spectrum to aid in distinguishing the signals.

The invention further provides a conference controller for controlling a conference involving multiple communications endpoints, the controller comprising:

a) a processor for assigning to a first of the endpoints a first position in a stereo spectrum;

b) a network connection for communicating to the first endpoint the assigned first stereo position;

c) an input for receiving from the first endpoint a first stereo signal encoded at the assigned first stereo position; and d) conferencing means for transmitting the received first stereo signal to a plurality of the other the endpoints.

The invention additionally provides a computer program product comprising instructions which when executed in a processor are effective to cause the processor to control a conference of multiple communications endpoints according to the steps of:

a) assigning to a first of the endpoints a first position in a stereo spectrum;

b) communicating to the first endpoint the assigned first stereo position;

c) receiving from the first endpoint a first stereo signal encoded at the assigned first stereo position; and d) transmitting the received first stereo signal to a plurality of the other the endpoints.

In another aspect the invention provides a method of generating a communications signal at an endpoint for use in a conference, comprising the steps of:

a) receiving from a conference controller an identifier of a position in a stereo spectrum;

b) generating an audio signal for transmission to the conference such that the audio signal is a stereo signal encoded at the position in the stereo spectrum; and c) transmitting the stereo audio signal to a conference endpoint or conference bridge.

In this aspect the invention also provides a communications endpoint having a stereo audio output and a connection for a network, the endpoint further comprising:

a) a data input for receiving from a conference controller via the network an identifier of a position in a stereo spectrum;

b) an audio signal processor for generating, in response to the identifier, an audio signal for transmission to the conference such that the audio signal is a stereo signal encoded at the position in the stereo spectrum; and c) an output for transmitting the stereo audio signal to a conference endpoint or conference bridge via the network.

The invention further provides a computer program product comprising instructions which when executed in a communications endpoint having a network connection are effective to cause the endpoint to:

a) receive from a conference controller via the network an identifier of a position in a stereo spectrum;

b) generate, in response to the identifier, an audio signal for transmission to the conference such that the audio signal is a stereo signal encoded at the position in the stereo spectrum; and c) transmit the stereo audio signal to a conference endpoint or conference bridge via the network.

In a further aspect the invention provides a method of processing audio signals in a conference, comprising the steps of comparing the characteristics of the audio signal from at least two endpoints to determine a degree of similarity; making a determination whether or not a pair of signals are similar to one another; and on determining that the pair of signals are similar to one another, issuing instructions to at least one of said endpoints to cause said endpoint to process the its audio output in a manner leading to said signals being aurally distinguishable from one another.

In a preferred embodiment the instructions are effective to cause said endpoint to output in stereo at a defined stereo position which is distinctive relative to one or more other endpoint signals.

Alternatively, the signal can be processed using techniques such as frequency equalization, normalisation/compression, spectral enhancement, noise gating etc., to change its characteristics.

BRIEF DESCRIPTION OF THE DRAWINGS

The invention will now be further illustrated by the following description of embodiments thereof, given by way of example only with reference to the accompanying drawings, in which:

FIG. 3 is a representation of a stereo record maintained at a conference server;

FIG. 9 is a representation of a stereo record maintained at a conference server; and FIG. 10 is a representation of an updated stereo record maintained at a conference server.

DETAILED DESCRIPTION OF PREFERRED EMBODIMENTS

Figure 1:
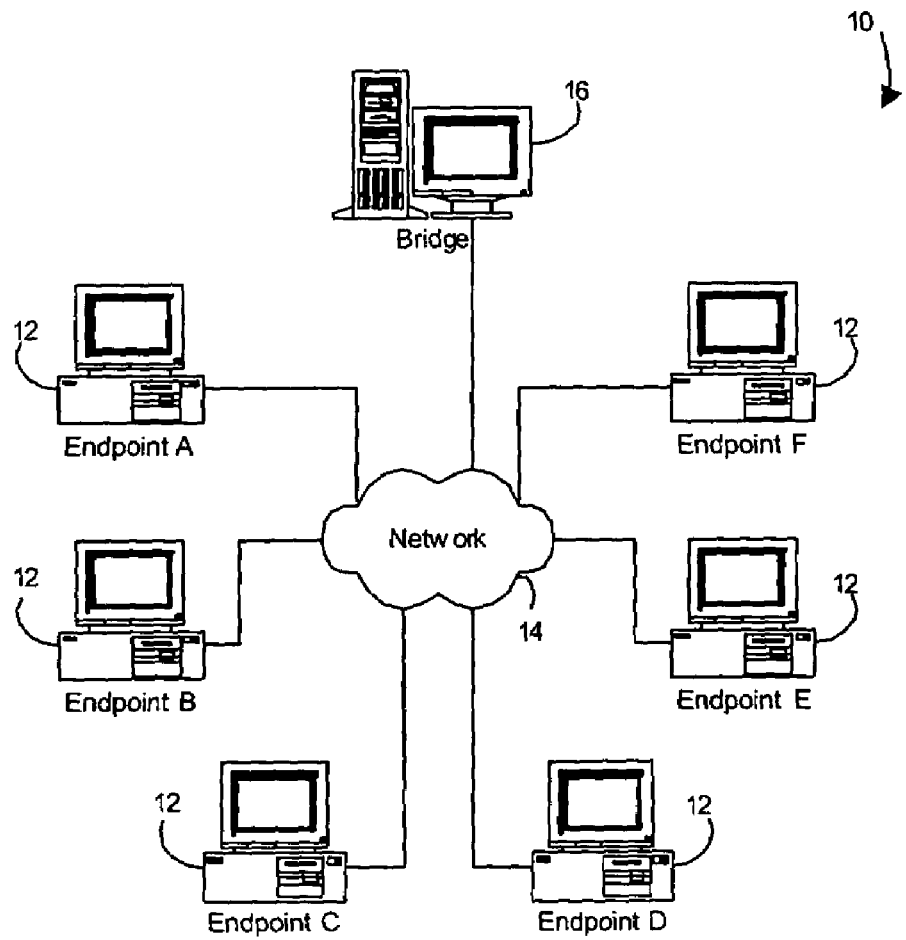
FIG. 1 is an architecture of a conferencing system.

In FIG. 1 there is indicated, generally at 10, a conference environment in which a plurality of endpoints 12 (designated as endpoints A to F) are connected via a network 14 which may be a local area network or wide area network such as the Internet. Each endpoint 12 is shown as a personal computer terminal which has standard input and output facilities enabling a user (not shown) at the endpoint to communicate with other users via the network 14. Communications can be by voice, video or other multimedia data types.

A conference bridge 16 controls conference facilities between the endpoints 12 and enables a plurality of users to communicate simultaneously with one another in a private conference environment. Conference bridge 16 provides all of the usual facilities which are generally known in the art to the skilled person.

Unlike conventional monaural (or mono) voice conferencing, the endpoints 12 are each provided with a stereo output (such as a set of speakers or headphones). In this way, audio signals which are received in can be played to the user to provide the impression of spatial positioning of the sounds. It is in this context that the invention operates so that users who are engaged in a conference which includes an audio component are provided with the perception that other conferees are distributed spatially around them.

Figures 2, 4:
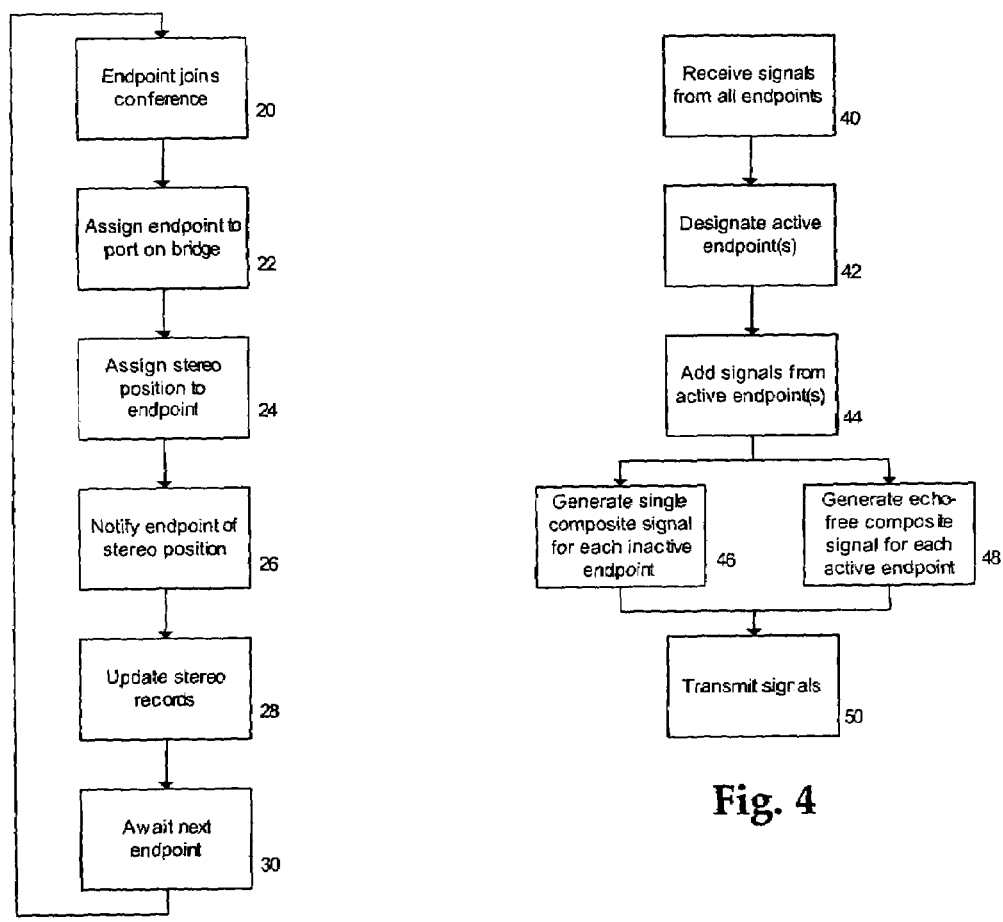
FIG. 2 is a flowchart of a process for controlling endpoints as they join a stereo conference.
FIG. 4 is a flowchart of a process for processing audio signals in a stereo conference.

Referring to FIG. 2, the operation of the invention will be described with reference to a flowchart of the steps taken by the conference server 16. When an endpoint 12 joins the conference, step 20, the server assigns the endpoint to a port. In a typical conference there will be three or more endpoints, each assigned to a different port. In this way, the conference server can distinguish between the signals coming from each endpoint according to the port at which they are received, or using calling line ID, IP address etc.

The conference bridge also assigns a stereo position to the endpoint, step 24. This step will be described further below, but suffice to say that each endpoint can be assigned a unique stereo position, or endpoints can be grouped together and assigned one of a number of common positions. The assigned stereo position is notified to the endpoint, step 26, and the records of the assigned stereo positions are updated at the server, step 28. The server then awaits the next endpoint while conducting conference processing as usual.

Referring to FIG. 3, a representation of the server records of assigned stereo positions is shown. A set of twenty-one stereo positions are provided. The first row shows the position number assigned to each stereo position ranging from 1 to 21. The second row of the table shows the relative left channel signal strength of a bipolar (i.e. left-right) stereo signal for each assigned stereo position. Similarly, the third row shows the relative right channel signal strength for each position.

Thus, for example, assigned stereo position no. 4 (as indicated in the column which is headed "4") is generated as an 85:15 ratio of left to right channel volume. Assigned stereo position 11 is a 50:50 or equally balanced mix. Assigned stereo position 21 is a 0:100 mix, i.e. has all of the audio signal carried in the right channel of the bipolar stereo signal and no signal in the left channel. In this way, any one of twenty-one spatially distinct stereo positions can be assigned to each endpoint.

It will be appreciated that fewer or more positions can be provided as appropriate and more sophisticated systems or different representations can also be used.

In a multi-channel stereo system such as Dolby 5.1 or 6.1 surround sound ("Dolby" is a Trademark of Dolby Laboratories), there will be potential to create a greater number of distinct stereo positions, and appropriate records and spatial separation between the various positions can be generated according to the wishes of the system designer.

As indicated in FIG. 2, each endpoint is assigned a stereo position when it joins the conference. Thus endpoint A is at position 6 (a left:right mix of 75:25), endpoint B is at position 13 (40:60) and so on as indicated in the fourth row of the table shown in FIG. 3. If a new endpoint joins the conference it can either be fitted into an empty position or each of the endpoints can be shifted to provide the best spatial separation for all endpoints.

To give an example, a conference with three participants might employ positions 5, 11 and 17 respectively for the three participants so that one participant dominates the left end of the spectrum, one dominates the right end of the spectrum and one is in the centre. If a fourth participant joins, it may be preferred to shift each of the three existing participants slightly to accommodate the new participant. Thus, the three existing participants could be shifted from positions 5, 11 and 17 to positions 4, 13 and 18 and to place the new participant at position 8. This would place the various participants at wide left, centre left, centre right and wide right, respectively. The algorithm for assigning endpoints can be as sophisticated or simple as desired.

Turning now to FIG. 4, the processing of the audio signals themselves is illustrated. As indicated previously, each endpoint has a stereo position assigned to it and notified to it in step 26 of FIG. 2. The stereo position can be communicated as an identifier (e.g. a number, letter or other identifier which has an understood meaning by all of the endpoints, an example being position no. 5 or position no. 15 as shown in FIG. 3), or it can be communicated as a set of instructions (such as "assign 90% of the signal power to the left channel and 10% of the signal power to the right channel"). The telephony or conferencing software on the client device encodes an audio signal as normal and then applies the necessary stereo processing to comply with the instructions received.

Referring to FIG. 4, the stereo audio signal is received from each endpoint, step 40. Optionally, in step 42, one or more active endpoints is designated based on the most recent speaker, the three loudest speakers, or any other suitable conferencing algorithm. The signals from all active endpoints are then added together, step 44, and this generates a single composite signal for each of the inactive endpoints, step 46.

The conference bridge or server is also adapted to process mono signals and in the event that an endpoint is not stereo capable it will simply transmit in mono and this signal can be added into the mix without being panned to a specific stereo position. The bridge could also generate a stereo signal from the received mono signal, as in the prior art, and add this in, but for the reasons already discussed this is less preferable than having stereo capable endpoints.

For the active endpoints, a slightly different signal is generated, in which the signal which originally emanated from that endpoint is subtracted from the mix to assist in echo reduction. Alternatively, rather than first adding all the signal together and subtracting that endpoint's signal, one can simply generate a composite signal for each active endpoint by adding together the signals from all of the other active endpoints. The composite signal generated in step 48 can therefore be transmitted to the active endpoints to result in an echo-free signal. Finally, the composite signal or signals are transmitted to the endpoints, where they can be decoded and played in stereo without any further significant processing.

The described process is, of course, a very simple description of the signal processing. There can be more sophisticated steps including error correction, level adjustment, noise reduction and so on.

Figure 5:
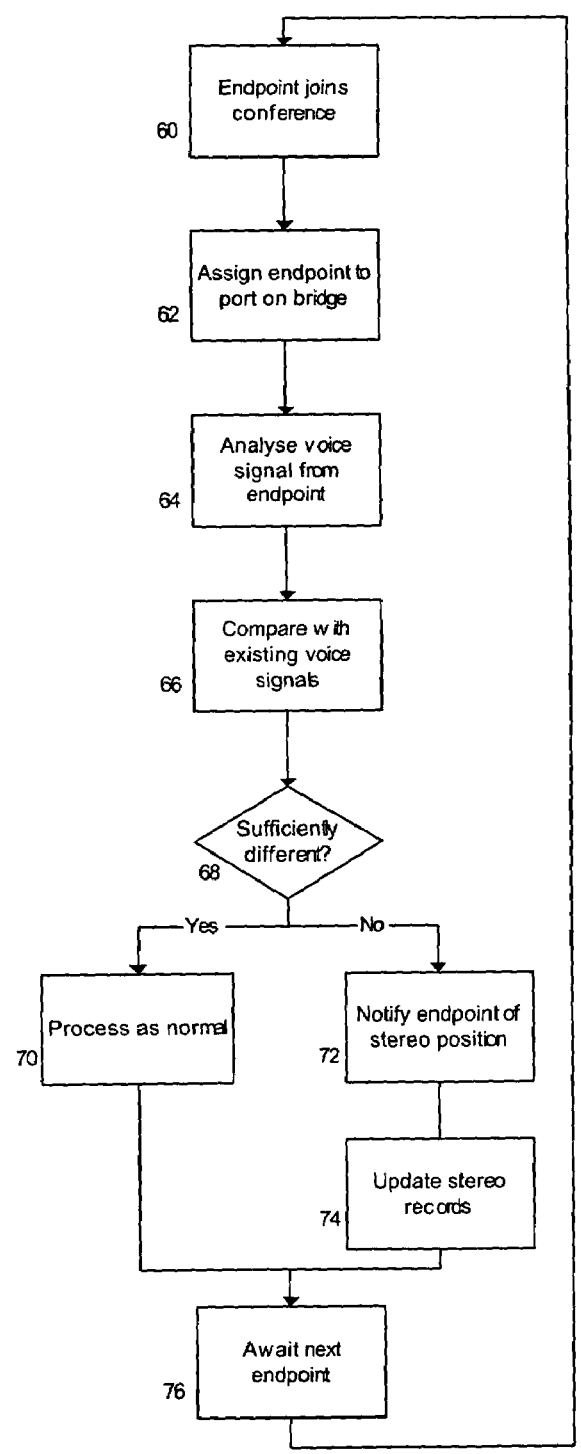
FIG. 5 is a flowchart of another process for controlling endpoints as they join a stereo conference.

A modified process is shown in FIG. 5. Rather than providing every endpoint with a unique stereo position, the stereo position is used simply to distinguish similar-sounding voices. Thus, an endpoint joins the conference, step 60 and is assigned to a port on the bridge, step 62. The voice signal from the endpoint is then analysed, step 64 and compared with existing voice signals, step 66 to arrive at a determination of whether or not it is sufficiently different, step 68.

If the signal is considered to be sufficiently different from each other signal currently involved in the conference, it is processed as normal, step 70. Otherwise, the endpoint is notified of a stereo position at which it should output, step 72.

Optionally, the or each other endpoint having a similar voice signal (as recognised in the comparison and determination steps 66 and 68) can similarly be assigned a unique stereo position in step 72.

The stereo records are updated in step 74 and the server then processes the signals while awaiting the next endpoint, step 76.

In this way, all of the endpoints which sound reasonably different to one another (so that a listener would have no difficulty in distinguishing the voices) can transmit as a monaural signal or a stereo signal which is equally balanced between left and right channels. When two voices are recognised to be sufficiently similar to give rise to a likelihood of confusion, they are spatially separated in the stereo spectrum to enable users to distinguish more easily between the speakers.

The determination and comparison can be conducted using any conventional signal processing steps. For example, a fast Fourier transform could be carried out on each signal to provide a frequency fingerprint and criteria can be assigned to determine whether two fingerprints are considered similar or different.

Figure 6:
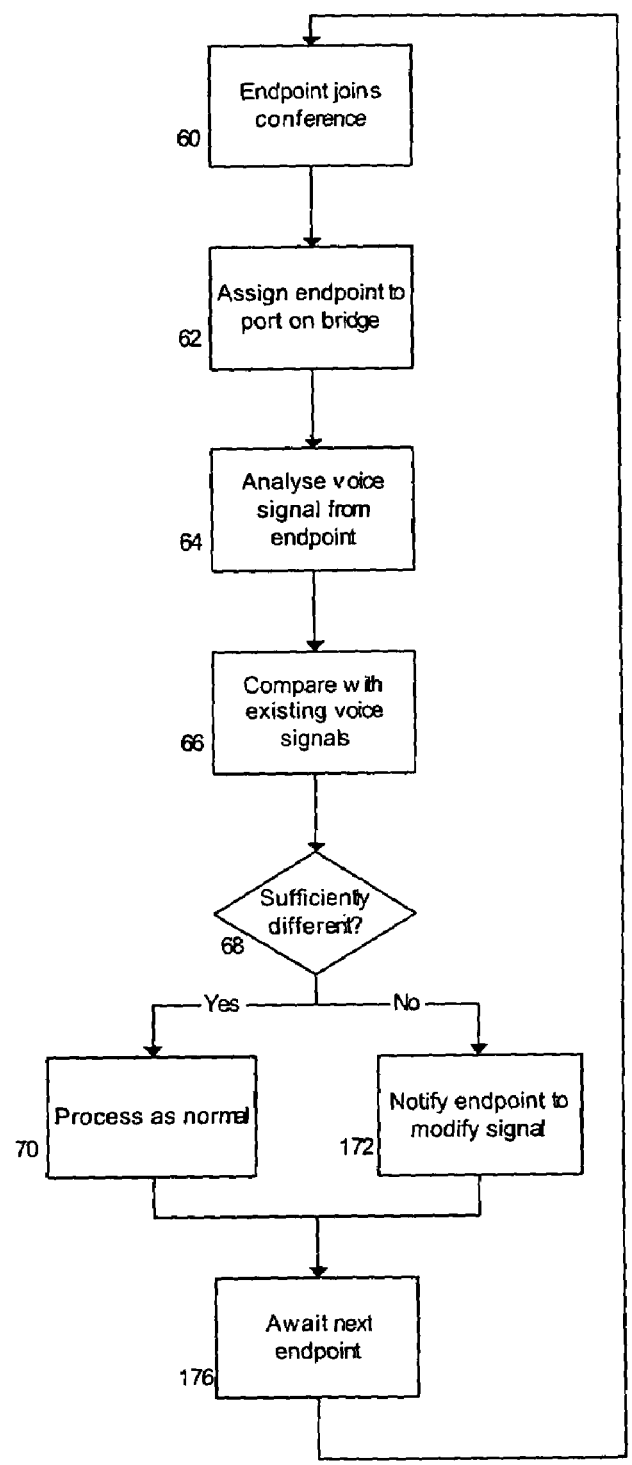
FIG. 6 is a flowchart of a further process for controlling endpoints as they join a conference.

A further alternative or additional way of processing signals is shown in FIG. 6. This is a more generalised case of the process of FIG. 5.

Accordingly, steps 60, 62, 64, 66 and 68 are carried out identically to determine whether each new signal is similar to or distinct from the other signals in the conference. If a signal is recognised to be sufficiently different from all of the other conference signals then it is processed as normal, step 70. If it not sufficiently different, then in step 172 the endpoint is notified to modify the signal appropriately. This can involve any suitable audio signal processing technique which modifies the voice signal to provide it a recognisably different sound. Processing then continues as before in step 76.

Figure 7:
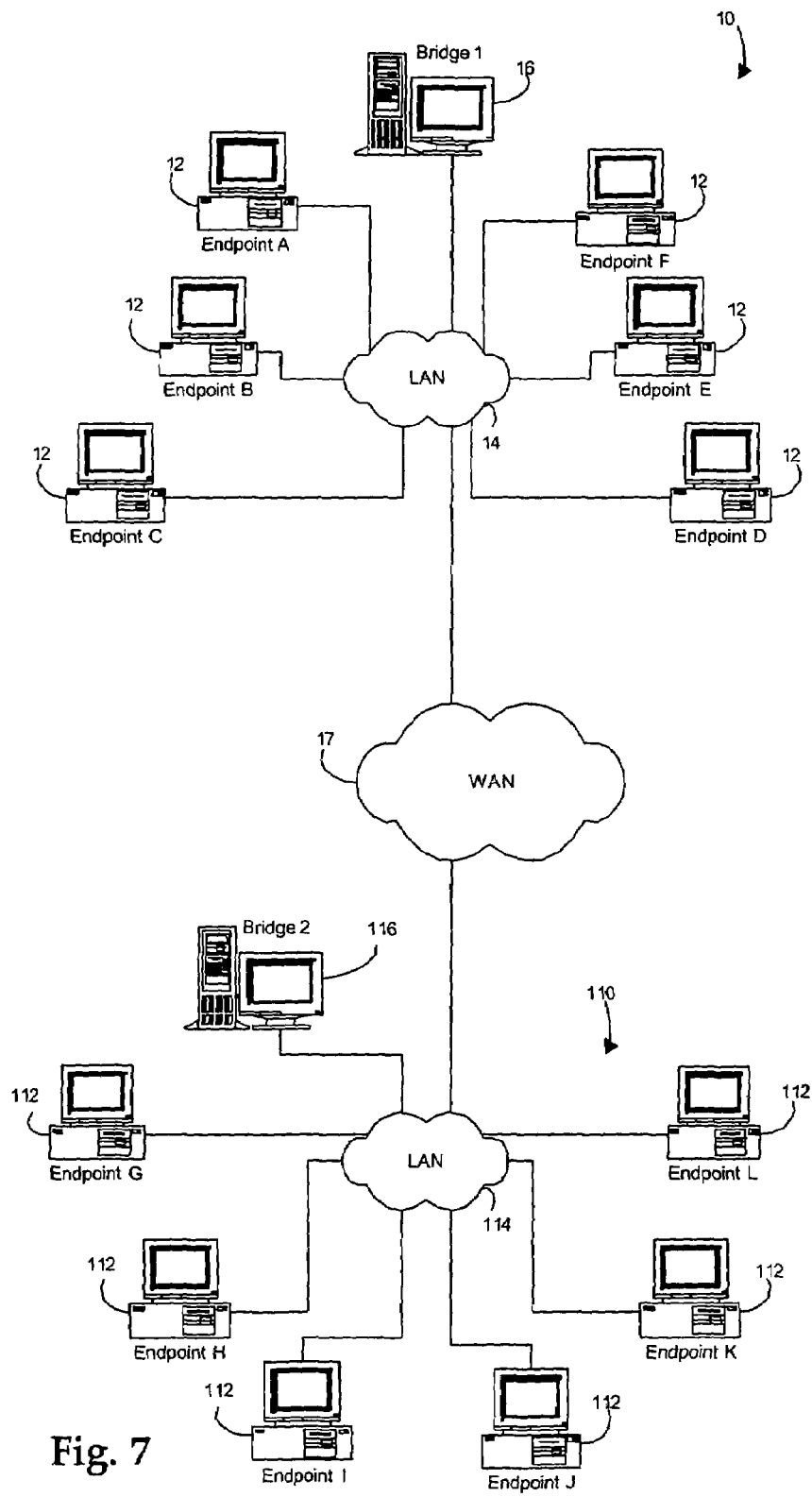
FIG. 7 is an architecture of a multiple-server conferencing environment.

It is often the case that a conference is conducted between multiple conference servers. FIG. 7 shows such an environment. The components of the system 10 of FIG. 1 are connected over a local area network (LAN) 14 as previously described. This LAN 14 is connected to a wide area network (WAN) 17 such as the Internet. A further and essentially identical system 110 is also connected to the WAN. Like parts are shown by like reference numerals incremented by 100, so that the endpoints 112 (denoted as endpoints G, H, I, J, K and L) have the same functionality as the endpoints 12 (denoted as endpoints A, B, C, D, E and F).

The conferencing between endpoints 12 is conducted under the control of a first bridge 16, and that between endpoints 112 is conducted by a second bridge 116.

Figure 8:
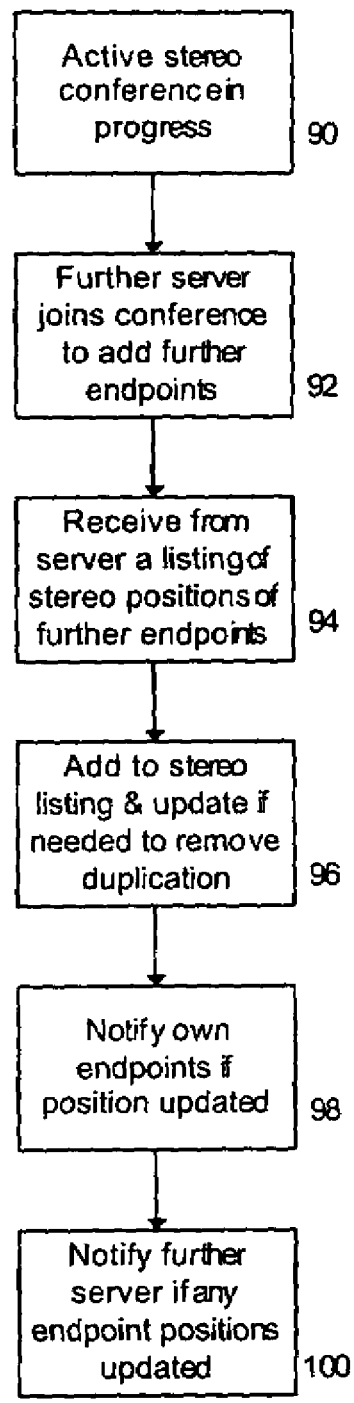
FIG. 8 is a flowchart of a process operating when a further server joins a conference.

FIG. 8 shows the steps taken when one or more of the endpoints 112 joins a conference controlled by bridge 16, where an active stereo conference is in progress, step 90. The server 116 of system 110 joins the conference to add endpoints 112, step 92. Server/bridge 16 receives, step 94, from server/bridge 116 a listing of the stereo positions (if any) already assigned to the endpoints 112. These are added into the stereo records of server 16, step 96, which then updates the various stereo positions to avoid duplication.

If reference is made to FIG. 9, it can be seen that the endpoints G to L have been assigned positions 3, 6, 9, 13, 16 and 19 which are precisely the same positions as are already assigned (FIG. 3) to endpoints A to F. Accordingly, to ensure a spatial distinction, the server shifts the positions of some of the endpoints so that the endpoints are relatively evenly spaced across the spectrum, resulting in the distribution shown in FIG. 10.

In FIG. 10, those endpoints whose position has been shifted are marked with an asterisk. The server notifies the endpoints under its own control of their updated positions, step 98 in FIG. 8, i.e. notifies endpoints A, B, D and E to switch respectively to positions 5, 12, 21 and 17. The server 16 then notifies server 116 that endpoints H, I and L are to move to positions 14, 1 and 8, respectively.

This approach simply seeks to maintain optimal stereo separation between endpoints. One might take the alternative approach of fitting the endpoints into a certain scheme whereby each endpoint identified as being with one team or organisation is switched to a common position or to a range of common positions (wide left, centre, etc.) when the second server joins the conference.

The invention is not limited to the embodiments described herein which may be varied without departing from the spirit of the invention.

The invention claimed is:

1. A method of conferencing multiple communications endpoints comprising the steps of:
   a) assigning to a first of said endpoints a first position in a stereo spectrum;
   b) communicating to said first endpoint the assigned first stereo position;
   c) receiving from said first endpoint a first stereo signal encoded at said assigned first stereo position; and
   d) transmitting said received first stereo signal to a plurality of the other said endpoints.

2. A method as claimed in claim 1, further comprising the steps of:
   a) assigning to a second of said endpoints a second position in said stereo spectrum;
   b) communicating to said second endpoint the assigned second stereo position;
   c) receiving from said second endpoint a second stereo signal encoded at said assigned second stereo position; and
   d) transmitting said received second stereo signal to a plurality of other endpoints.

3. A method as claimed in claim 2, wherein the first and second signals are added to one another before being transmitted to the plurality of other endpoints.

4. A method as claimed in claim 2, wherein one of said first and second signals is selected for transmission and is transmitted to the plurality of other endpoints without adding the signal which is not selected.

5. A method as claimed in claim 2, wherein a stereo position is assigned to each of the plurality of endpoints which is active in a conference and the assigned stereo position for each endpoint is transmitted to that endpoint.

6. A method as claimed in claim 5, wherein each endpoint is assigned a unique stereo position.

7. A method as claimed in claim 5, wherein one or more of the endpoints is assigned a common stereo position.

8. A method as claimed in claim 5, wherein stereo signals are received from each of said endpoints and the received stereo signal from a single endpoint is selected for transmission to all other endpoints.

9. A method as claimed in claim 5, wherein stereo signals are received from each of said endpoints and a subset of the received stereo signals from a subset of the endpoints are added together to provide a composite stereo signal for transmission to all other endpoints.

10. A method as claimed in claim 9, wherein each endpoint in the subset of endpoints receives the composite signal minus the contribution made to the composite signal by its own stereo signal.

11. A method as claimed in claim 9, wherein the amplitudes of the signals are adjusted before being added to provide the composite signal.

12. A method as claimed in claim 5, wherein all of the received signals from all of the active endpoints are added together to provide a composite signal.

13. A method as claimed in claim 12, wherein said composite signal is transmitted to every endpoint.

14. A method as claimed in claim 12, wherein each endpoint in the subset of endpoints receives the composite signal minus the contribution made to the composite signal by its own stereo signal.

15. A method as claimed in claim 1, when conducted by a first conference server which controls said multiple communications endpoints, further comprising the steps of:
   a) receiving from a second conference server an identification of the stereo position assigned to at least one further endpoint under the control of the second conference server;
   b) comparing the stereo position of the at least one further endpoint with the stereo positions of the endpoints under the control of the first conference server; and
   c) transmitting instructions to at least one endpoint which instructions are effective to cause the endpoint to vary its stereo position or transmitting instructions to the further conference server to cause the at least one further endpoint under the control of the second conference server to vary its stereo position.

16. A method as claimed in claim 1, further comprising the steps of comparing the characteristics of the audio signal from said first endpoint with the characteristics of the audio signal from one or more of the other endpoints, and making a determination of the assignment of stereo position based on said comparison, whereby similar sounding signals are spatially separated in the stereo spectrum to aid in distinguishing the signals.

17. A conference controller for controlling a conference involving multiple communications endpoints, the controller comprising:
   a) a processor for assigning to a first of said endpoints a first position in a stereo spectrum;
   b) a network connection for communicating to said first endpoint the assigned first stereo position;
   c) an input for receiving from said first endpoint a first stereo signal encoded at said assigned first stereo position; and
   d) conferencing means for transmitting said received first stereo signal to a plurality of the other said endpoints.

18. A computer program product comprising instructions which when executed in a processor are effective to cause said processor to control a conference of multiple communications endpoints according to the steps of:
   a) assigning to a first of said endpoints a first position in a stereo spectrum;
   b) communicating to said first endpoint the assigned first stereo position;
   c) receiving from said first endpoint a first stereo signal encoded at said assigned first stereo position; and
   d) transmitting said received first stereo signal to a plurality of the other said endpoints.

19. A method of generating a communications signal at an endpoint for use in a conference, comprising the steps of:
   a) receiving from a conference controller an identifier of a position in a stereo spectrum;
   b) generating an audio signal for transmission to the conference such that said audio signal is a stereo signal encoded at said position in said stereo spectrum; and
   c) transmitting said stereo audio signal to a conference endpoint or conference bridge.

20. A communications endpoint having a stereo audio output and a connection for a network, the endpoint further comprising:
   a) a data input for receiving from a conference controller via the network an identifier of a position in a stereo spectrum;
   b) an audio signal processor for generating, in response to said identifier, an audio signal for transmission to the conference such that said audio signal is a stereo signal encoded at said position in said stereo spectrum; and
   c) an output for transmitting said stereo audio signal to a conference endpoint or conference bridge via the network.

21. A computer program product comprising instructions which when executed in a communications endpoint having a network connection are effective to cause said endpoint to:
   a) receive from a conference controller via the network an identifier of a position in a stereo spectrum;
   b) generate, in response to said identifier, an audio signal for transmission to the conference such that said audio signal is a stereo signal encoded at said position in said stereo spectrum; and
   c) transmit said stereo audio signal to a conference endpoint or conference bridge via the network.

22. A method of processing audio signals in a conference, comprising the steps of comparing the characteristics of the audio signal from at least two endpoints to determine a degree of similarity; making a determination whether or not a pair of signals are similar to one another; and on determining that the pair of signals are similar to one another, issuing instructions to at least one of said endpoints to cause said endpoint to process the its audio output in a manner leading to said signals being aurally distinguishable from one another.

23. A method as claimed in claim 22, wherein said instructions are effective to cause said endpoint to output in stereo at a defined stereo position which is distinctive relative to one or more other endpoint signals.

24. A method as claimed in claim 22, wherein said instructions are effective to cause said endpoint to process its audio output such that its frequency characteristics are varied in a manner making it audibly distinguishable from the unprocessed output.

* * * * *